(12) United States Patent
Kouketsu et al.

(10) Patent No.: US 9,010,736 B2
(45) Date of Patent: *Apr. 21, 2015

(54) LIQUID CONTROL APPARATUS

(71) Applicant: CKD Corporation, Komaki-shi, Aichi (JP)

(72) Inventors: Masayuki Kouketsu, Komaki (JP); Hiroshi Itafuji, Komaki (JP)

(73) Assignee: CDK Corporation, Komaki-shi, Aichi (JP)

( * ) Notice: Subject to any disclaimer, the term of this patent is extended or adjusted under 35 U.S.C. 154(b) by 414 days.

This patent is subject to a terminal disclaimer.

(21) Appl. No.: 13/631,003

(22) Filed: Sep. 28, 2012

(65) Prior Publication Data

US 2013/0081712 A1    Apr. 4, 2013

(30) Foreign Application Priority Data

Sep. 30, 2011 (JP) ................................. 2011-215866
Feb. 27, 2012 (JP) ................................. 2012-039768

(51) Int. Cl.
*B01B 1/00* (2006.01)
*F16K 49/00* (2006.01)

(52) U.S. Cl.
CPC .............. *F16K 49/002* (2013.01); *B01B 1/005* (2013.01)

(58) Field of Classification Search
CPC ............. B01L 2400/0406; B01L 3/502; B01J 2219/00641
USPC ......................................... 261/142, 153, 154
See application file for complete search history.

(56) References Cited

U.S. PATENT DOCUMENTS

| | | | |
|---|---|---|---|
| 8,361,231 B2* | 1/2013 | Kouketsu et al. | 118/725 |
| 8,840,049 B2 | 9/2014 | Kouketsu et al. | |
| 2002/0003933 A1* | 1/2002 | Sherrer et al. | 385/83 |
| 2005/0006609 A1 | 1/2005 | Fukano | |
| 2007/0101940 A1 | 5/2007 | Iizuka | |
| 2012/0180724 A1 | 7/2012 | Kouketsu et al. | |
| 2013/0193230 A1 | 8/2013 | Kouketsu et al. | |

(Continued)

FOREIGN PATENT DOCUMENTS

| | | |
|---|---|---|
| JP | 49-52175 | 5/1974 |
| JP | 5-156448 | 6/1993 |

(Continued)

OTHER PUBLICATIONS

International Search Report dated Nov. 29, 2011 from International Application No. PCT/JP2011/069960.

(Continued)

*Primary Examiner* — Duane Smith
*Assistant Examiner* — Adam W Bergfelder
(74) *Attorney, Agent, or Firm* — Beyer Law Group LLP

(57) ABSTRACT

A liquid control apparatus that controls a spread of a liquid has a main body that has a supply subject surface onto which the liquid is supplied. The apparatus also has a mesh form body that is woven into a mesh form and provided to contact the supply subject surface. A heater that heats the supply subject surface is provided in an interior of the main body. A supply port is provided in the main body to supply the liquid from the interior of the main body to a part of the supply subject surface contacted by the mesh form body. A groove is provided in the supply subject surface to suppress spreading of the liquid from the supply port to a side opposite to the heater in an expanse direction of the supply subject surface.

18 Claims, 17 Drawing Sheets

(56) References Cited

U.S. PATENT DOCUMENTS

| | | |
|---|---|---|
| 2013/0298834 A1 | 11/2013 | Kouketsu et al. |
| 2014/0015151 A1 | 1/2014 | Kouketsu et al. |

FOREIGN PATENT DOCUMENTS

| | | |
|---|---|---|
| JP | 6-132209 | 5/1994 |
| JP | 6-232035 | 8/1994 |
| JP | 7-47201 | 2/1995 |
| JP | 7-155584 | 6/1995 |
| JP | 9-152287 | 6/1997 |
| JP | 9-186107 | 7/1997 |
| JP | 10-337464 | 12/1998 |
| JP | 2001-295050 | 10/2001 |
| JP | 2002-228117 | 8/2002 |
| JP | 2004-115920 | 4/2004 |
| JP | 2005-57193 | 3/2005 |
| JP | 2006-352001 | 12/2006 |
| JP | 2008-263244 | 10/2008 |
| JP | 2009-38047 | 2/2009 |
| JP | 2009-194246 | 8/2009 |
| JP | 4673449 | 1/2011 |
| WO | WO 2004/092622 | 10/2004 |

OTHER PUBLICATIONS

U.S. Appl. No. 13/945,710, filed Jul. 18, 2013.
Office Action in U.S. Appl. No. 13/630,987 dated Oct. 7, 2014.
U.S. Appl. No. 13/630,987, filed Sep. 28, 2012.

* cited by examiner

LIQUID CONTROL APPARATUS

CROSS-REFERENCE TO RELATED APPLICATIONS

The present application claims priority based on Japan Patent Application No. 2011-215866 filed on Sep. 30, 2011 and Japan Patent Application No. 2012-39768 filed on Feb. 27, 2012, and the entire contents of those applications are incorporated by reference in this specification.

BACKGROUND OF THE INVENTION

1. Field of the Invention

The present invention relates to a liquid control apparatus for controlling a spread of a liquid contacting a surface.

2. Description of the Related Art

In this type of liquid control apparatus, minute irregularities are formed on a heat storage plate by disposing to overlap meshes (mesh form bodies) on an upper surface of the heat storage plate (Japanese Patent Publication No. 4673449). According to the apparatus described in Japanese Patent Publication No. 4673449, a liquid supplied between the upper surface of the heat storage plate and the mesh is caused to spread by interfacial tension, and therefore the liquid can be supplied over a large surface area of the mesh.

In the apparatus described in Japanese Patent Publication No. 4673449, although the liquid can be caused to spread over the upper surface of the heat storage plate using the interfacial tension generated by the minute irregularities, there remains room for improvement in terms of causing the liquid contacting the surface to spread preferentially in a desired direction.

SUMMARY OF THE INVENTION

The present invention has been designed in consideration of these circumstances, and a main object thereof is to provide a liquid control apparatus with which a liquid contacting a surface can be caused to spread preferentially in a desired direction.

To achieve the object described above, the present invention employs following means.

First means is a liquid control apparatus controlling a spread of a liquid, including: a main body having a supply subject surface onto which the liquid is supplied; and a mesh form body woven into a mesh form and provided to contact the supply subject surface. A heater configured to heat the supply subject surface is provided in an interior of the main body. A supply port is provided in the main body to supply the liquid from the interior of the main body to a part of the supply subject surface contacted by the mesh form body. And a groove is provided in the supply subject surface to suppress spreading of the liquid from the supply port to an opposite side to the heater in an expanse direction of the supply subject surface.

According to the configuration described above, the mesh form body is woven into mesh form and provided to contact the supply subject surface of the main body, and therefore a plurality of interfaces are formed between the supply subject surface and the mesh form body. As a result, the liquid supplied onto the supply subject surface is caused to spread over the supply subject surface by interfacial tension between the plurality of interfaces.

The liquid supplied to the supply subject surface of the main body is caused to spread by interfacial tension in a plurality of interfaces formed between the supply subject surface and the mesh form body. When the groove is formed in the supply subject surface, on the other hand, an interface is not formed between the supply subject surface and the mesh form body in a part where the groove is formed, and therefore spreading of the liquid is suppressed.

Hence, with the configuration described above, spreading of the liquid from the supply port to the side opposite to the heater in the expanse direction of the supply subject surface is suppressed by the groove provided in the supply subject surface. By suppressing spreading of the liquid to the side opposite to the heater, spreading of the liquid to the side of the heater can be promoted. As a result, heating of the liquid by the heater can be promoted.

Second means is a liquid control apparatus controlling a spread of a liquid, including: a main body having a supply subject surface onto which the liquid is supplied; and a mesh form body woven into a mesh form and provided to contact the supply subject surface A temperature sensor for detecting a temperature of the supply subject surface is provided in an interior of the main body. A supply port is provided in the main body to supply the liquid from the interior of the main body to a part of the supply subject surface contacted by the mesh form body. And a groove is provided in the supply subject surface to suppress spreading of the liquid from the supply port to an opposite side to the temperature sensor in an expanse direction of the supply subject surface.

With the configuration described above, spreading of the liquid from the supply port to the side opposite to the temperature sensor in the expanse direction of the supply subject surface is suppressed by the groove provided in the supply subject surface. By suppressing spreading of the liquid to the side opposite to the temperature sensor, spreading of the liquid to the side of the temperature sensor can be promoted. As a result, the precision with which a degree of vaporization of the liquid is measured can be improved.

The above and other objects, features, and advantages of the present invention will be apparent from the following description when taken in conjunction with the accompanying drawings which illustrate preferred embodiments of the present invention by way of example.

DESCRIPTION OF THE PREFERRED EMBODIMENTS

An embodiment will be described below with reference to the drawings. This embodiment is realized as a liquid vaporizer that vaporizes a chemical, mixes the vaporized chemical with an inert gas, and discharges the resulting mixture.

Figure 1A:
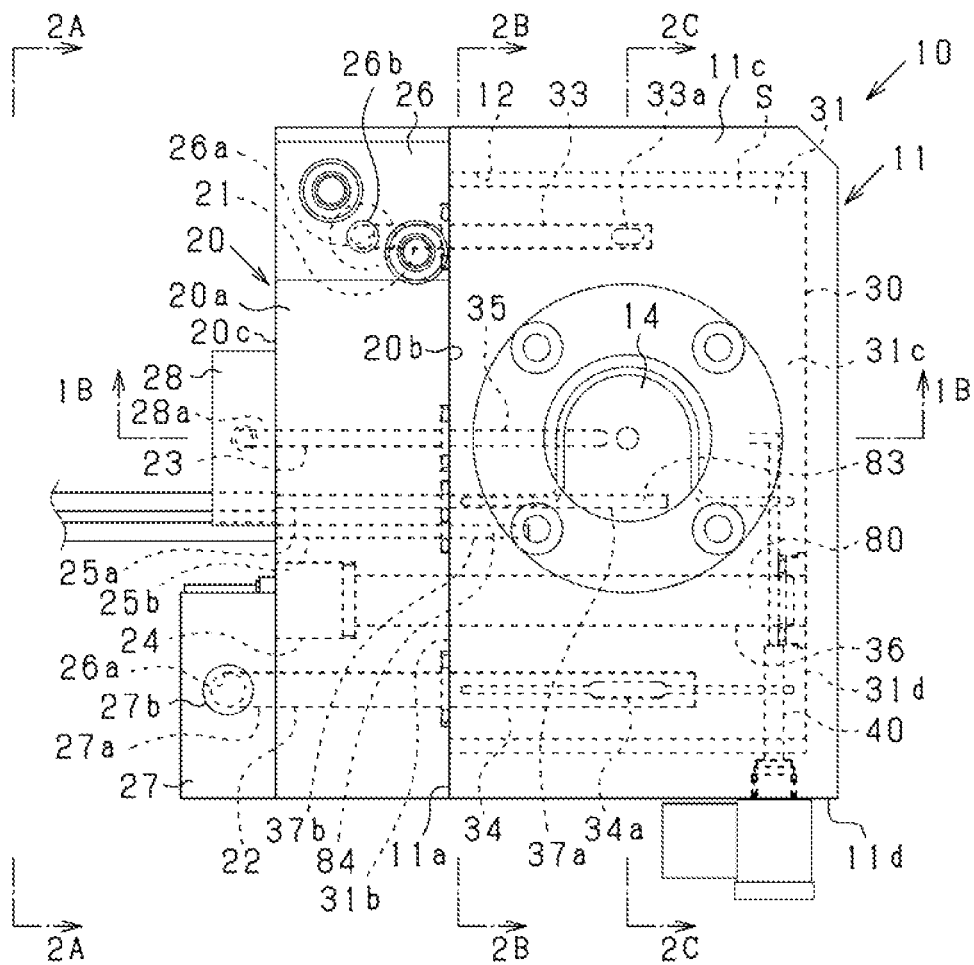
FIG. 1A is a plan view showing a liquid vaporizer.
Figure 1B:
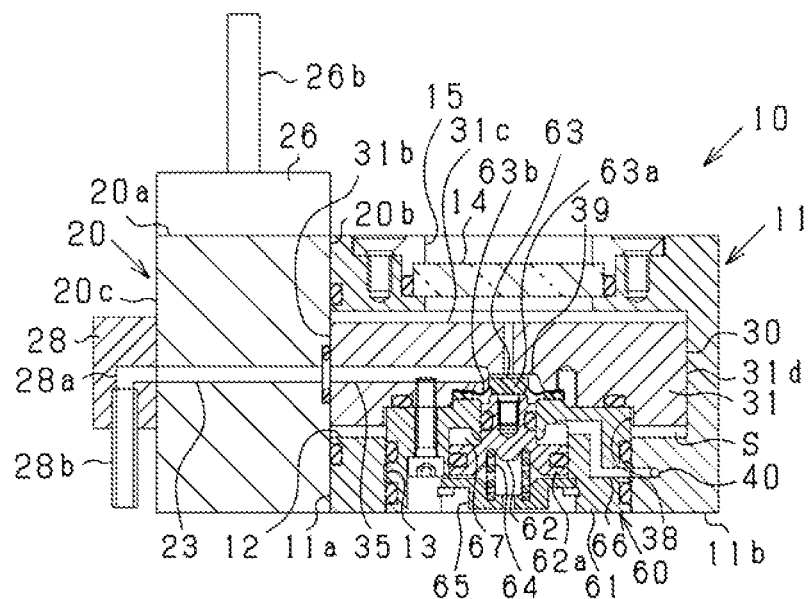
FIG. 1B is a sectional view taken along a 1B-1B line in FIG. 1A.

FIG. 1A is a plan view showing a liquid vaporizer 10, and FIG. 1B is a sectional view taken along a 1B-1B line in FIG. 1A. As shown in the drawings, the liquid vaporizer 10 includes a first housing 11, a second housing 20, a liquid control apparatus 30, a valve apparatus 60, a heater 80, thermocouples 83 and 84, and so on.

Figure 2A:
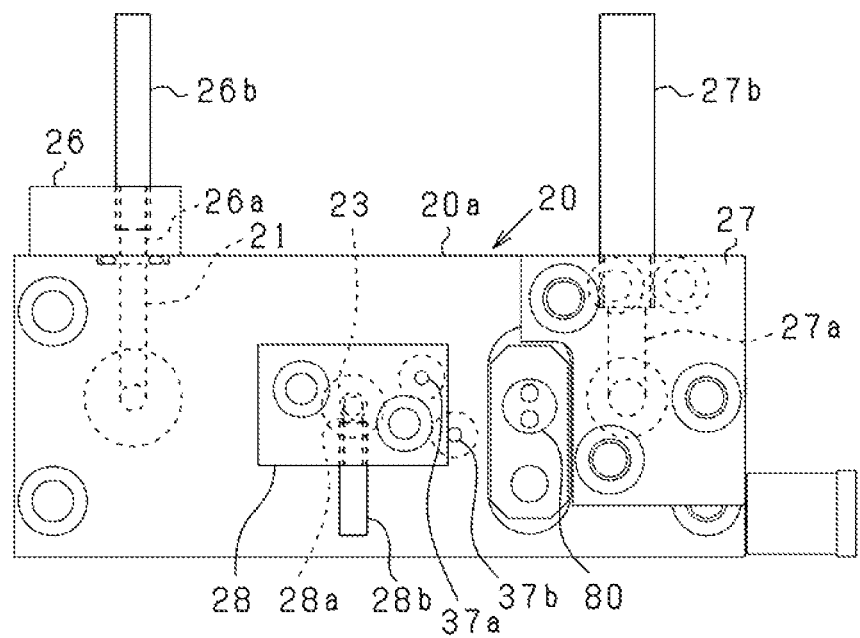
FIG. 2A is a side view showing a second housing from a 2A-2A line in FIG. 1A.
Figure 2B:
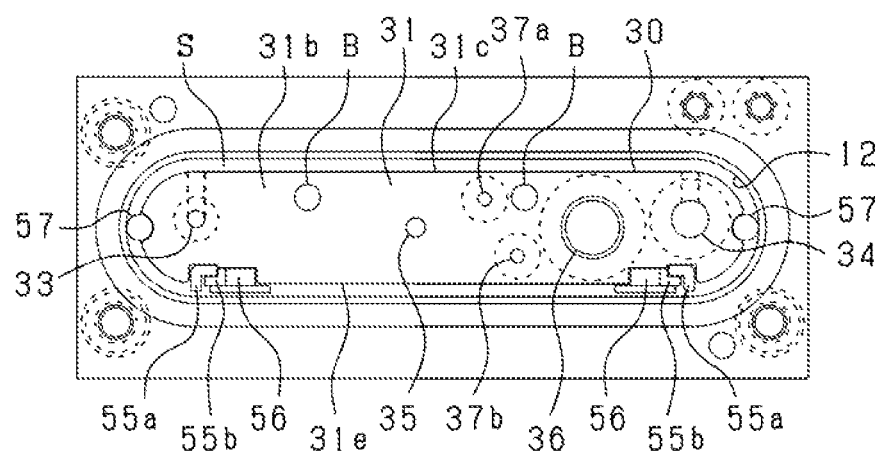
FIG. 2B is a sectional view taken along a 2B-2B line in FIG. 1A.

The first housing 11 is formed in the shape of a hollow rectangular parallelepiped, and a columnar space S having an oval bottom surface is formed in an interior thereof (refer to FIG. 2B). The columnar space S opens onto a side face 11a of the first housing 11 through an oval opening portion 12. An insertion hole 13 for inserting the valve apparatus 60 is formed in a lower surface 11b of the first housing 11. An attachment hole 15 for attaching a glass plate 14 is formed in an upper surface 11c of the first housing 11.

The liquid control apparatus 30 is inserted into the columnar space S through the opening portion 12 (refer to FIG. 2B). Further, the valve apparatus 60 is inserted into the insertion hole 13. The first housing 11 and the valve apparatus 60 are sealed from each other by a sealing member. The glass plate 14 is attached to the attachment hole 15 by a fastening member. The first housing 11 and the glass plate 14 are sealed from each other by a sealing member. An operator can observe the interior of the first housing 11 from above via the glass plate 14.

FIG. 2A is a side view showing the second housing 20 from a 2A-2A line in FIG. 1A. Referring also to FIG. 2A, the second housing 20 is formed in the shape of a rectangular parallelepiped and attached to the side face 11a of the first housing 11. The first housing 11 and the second housing 20 are sealed from each other by a sealing member. In the second housing 20, a surface that opposes the side face 11a of the first housing 11 serves as a side face 20b. A first gas flow passage 21, a second gas flow passage 22, a chemical flow passage 23, a heater insertion hole 24, and thermocouple insertion holes 25a and 25b are formed in the second housing 20.

The first gas flow passage 21 penetrates the second housing 20 from the side face 20b to an upper surface 20a. The second gas flow passage 22 penetrates from the side face 20b to a side face 20c opposite to the side face 20b. The first gas flow passage 21 and the second gas flow passage 22 are provided in positions close to respective ends of the upper surface 20a in a lengthwise direction thereof. The chemical flow passage 23 penetrates from the side face 20b to the side face 20c substantially in a center of the side face 20b and the side face 20c. The heater insertion hole 24 penetrates from the side face 20b to the side face 20c between the second gas flow passage 22 and the chemical flow passage 23. The thermocouple insertion holes 25a and 25b penetrate from the side face 20b to the side face 20c between the chemical flow passage 23 and the heater insertion hole 24.

A first block 26, a second block 27, and a chemical block 28 are attached to the second housing 20 by fastening members or the like.

The first block 26 is attached to the upper surface 20a of the second housing 20. A first block flow passage 26a is provided in the first block 26 to penetrate from a lower surface to an upper surface thereof. One end of the first block flow passage 26a is connected to the first gas flow passage 21. A first gas pipe 26b is connected to the other end of the first block flow passage 26a. Gas is introduced into the first block 26 from the first gas pipe 26b.

The second block 27 is attached to the side face 20c of the second housing 20. A second block flow passage 27a is provided in the second block 27 to penetrate from a side face to an upper surface thereof. One end of the second block flow passage 27a is connected to the second gas flow passage 22. A second gas pipe 27b is connected to the other end of the second block flow passage 27a. Gas is discharged from the second block 27 into the second gas pipe 27b.

The chemical block 28 is attached to the side face 20c of the second housing 20. A chemical block flow passage 28a is provided in the chemical block 28 to penetrate from a side face of the chemical block 28 to a lower surface thereof. One end of the chemical block flow passage 28a is connected to the chemical flow passage 23. A chemical pipe 28b is connected to the other end of the chemical block flow passage 28a. A chemical is introduced into the chemical block 28 from the chemical pipe 28b.

Figure 2C:
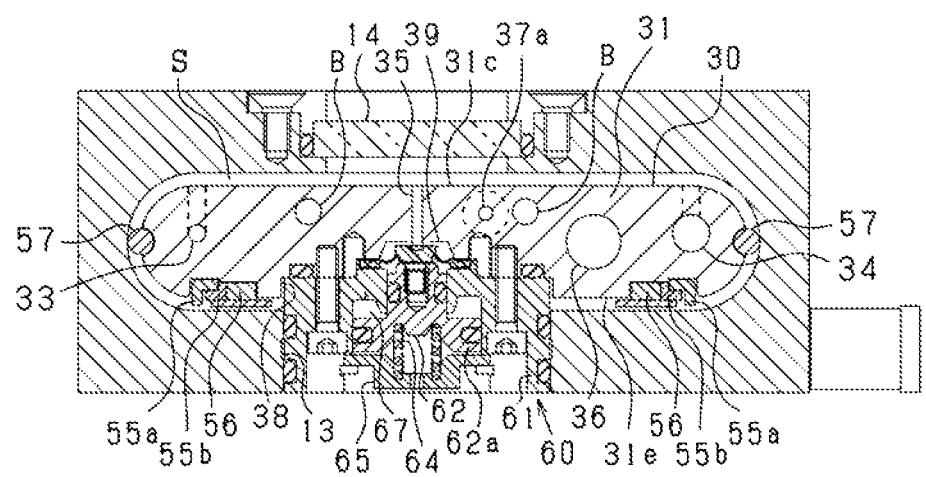
FIG. 2C is a sectional view taken along a 2C-2C line in FIG. 1A.

FIGS. 2B and 2C are a sectional view taken along a 2B-2B line in FIG. 1A and a sectional view taken along a 2C-2C line in FIG. 1A, respectively. Referring also to FIGS. 2B and 2C, the liquid control apparatus 30 includes a main body 31.

The main body 31 is formed in a columnar shape having an oval bottom surface so as to correspond to the columnar space S, and is formed to be slightly smaller than the columnar space S. As described above, the liquid control apparatus 30 is inserted into the columnar space S in the first housing 11 through the opening portion 12. The liquid control apparatus 30 is attached to the side face 20b of the second housing 20 using a fastening member in a through hole B formed in the main body 31. As a result, a gap having an oval tubular shape is formed between an inner peripheral surface of the first housing 11 and the main body 31. In the main body 31, a surface opposing the side face 20b of the second housing 20 serves as a side face 31b.

A first main body flow passage 33, a second main body flow passage 34, a chemical flow passage 35, a heater insertion hole 36, thermocouple insertion holes 37a, 37b, and a recessed portion 38 are formed in the main body 31.

The first main body flow passage 33 penetrates the main body 31 from a side face of the main body 31 to an upper surface thereof. One end of the first main body flow passage 33 is connected to the first gas flow passage 21. The other end of the first main body flow passage 33 opens substantially onto a center of the main body 31 in a direction extending from the second housing 20 to the first housing 11 (a widthwise direction of an upper surface 31c of the main body 31).

The second main body flow passage 34 penetrates the main body 31 from the side face to the upper surface thereof. One end of the second main body flow passage 34 is connected to the second gas flow passage 22. The other end of the second main body flow passage 34 opens substantially onto the center of the main body 31 in the widthwise direction of the upper surface 31c of the main body 31. The first main body flow passage 33 and the second main body flow passage 34 are provided in positions close to respective ends of the upper surface 31c in a lengthwise direction thereof.

The chemical flow passage 35 penetrates the main body 31 from the side face 31b to the upper surface 31c thereof. One end of the chemical flow passage 35 is connected to the chemical flow passage 23. The other end of the chemical flow passage 35 opens substantially onto the center of the main body 31 in the widthwise direction of the upper surface 31c of the main body 31.

The heater insertion hole 36 is connected to the heater insertion hole 24, and extends from the side face 31b to the vicinity of a side face 31d opposite to the side face 31b. The heater 80 is inserted into the heater insertion holes 24 and 36, and the upper surface 31c is heated by the heater 80.

The thermocouple insertion hole 37a is connected to the thermocouple insertion hole 25a, and extends substantially to the center of the main body 31 in the widthwise direction of the upper surface 31c of the main body 31. The thermocouple insertion hole 37a is formed in the main body 31 in the vicinity of the upper surface 31c. The first thermocouple 83 (a temperature sensor) is inserted into the thermocouple insertion holes 25a and 37a, and a temperature in the vicinity of the upper surface 31c is detected by the first thermocouple 83.

The thermocouple insertion hole 37b is connected to the thermocouple insertion hole 25b, and extends to a position before the center of the main body 31 (approximately a ¼ position) in the widthwise direction of the upper surface 31c of the main body 31. The thermocouple insertion hole 37b is formed in the main body 31 in a position close to a lower surface 31e. The second thermocouple 84 (a temperature sensor) is inserted into the thermocouple insertion holes 25b and 37b, and a temperature in a position close to the lower surface 31e is detected by the second thermocouple 84.

The recessed portion 38 is formed in the main body 31 in a position opposing the insertion hole 13 in the first housing 11. The valve apparatus 60 is inserted into the insertion hole 13 and the recessed portion 38 and attached to the main body 31 by a fastening member or the like. The main body 31 and the valve apparatus 60 are sealed from each other by a sealing member. The recessed portion 38 communicates with the chemical flow passage 35. A valve seat 39 is provided in a communicating part between the chemical flow passage 35 and the recessed portion 38. A working gas flow passage 40 is formed in the main body 31. The working gas flow passage 40 extends in the lengthwise direction of the upper surface 11c of the first housing 11 from a side face 11d of the first housing 11 substantially to a center of the first housing 11, then turns in the widthwise direction of the upper surface 11c so as to communicate with the insertion hole 13. A control unit of the liquid control apparatus 30 controls introduction and discharge of a working gas into and from the working gas flow passage 40.

The valve apparatus 60 includes a main body 61, a piston 62, a diaphragm valve body 63, a spring 64, a spring retainer 65, and so on.

The main body 61 is formed in a cylindrical shape, and the piston 62 is housed in an interior thereof. The main body 61 and the piston 62 have matching central axes.

The piston 62 is supported by the main body 61 to be capable of sliding in a central axis direction. The main body 61 and the first housing 11, the main body 61 and the main body 31 of the liquid control apparatus 30, and the main body 61 and the piston 62 are respectively sealed from each other by sealing members.

A valve main body 63a of the diaphragm valve body 63 is attached to a tip end of the piston 62. An outer edge portion of a diaphragm 63b of the diaphragm valve body 63 is sandwiched between the main body 31 of the liquid control apparatus 30 and the main body 61.

One end of the spring 64 impinges on the piston 62, and the other end of the spring 64 is supported by the spring retainer 65. The piston 62 is biased toward the valve seat 39 by the spring 64. Hence, in a natural state, the valve main body 63a of the diaphragm valve body 63 is pressed against the valve seat 39 such that the chemical flow passage 35 is blocked.

A working gas flow passage 66 is formed in the main body 61. One end of the working gas flow passage 66 is connected to the working gas flow passage 40 in the first housing 11. The other end of the working gas flow passage 66 communicates with a pressurization chamber 67 formed in the main body 61 on a side opposite to the spring 64 across a flange portion 62a of the piston 62. When the working gas is introduced through the working gas flow passages 40 and 66, the piston 62 is moved in a direction heading away from the valve seat 39. As a result, the chemical flow passage 35 is opened such that the chemical is supplied to the upper surface 31c of the main body 31 of the liquid control apparatus 30.

Figure 3:
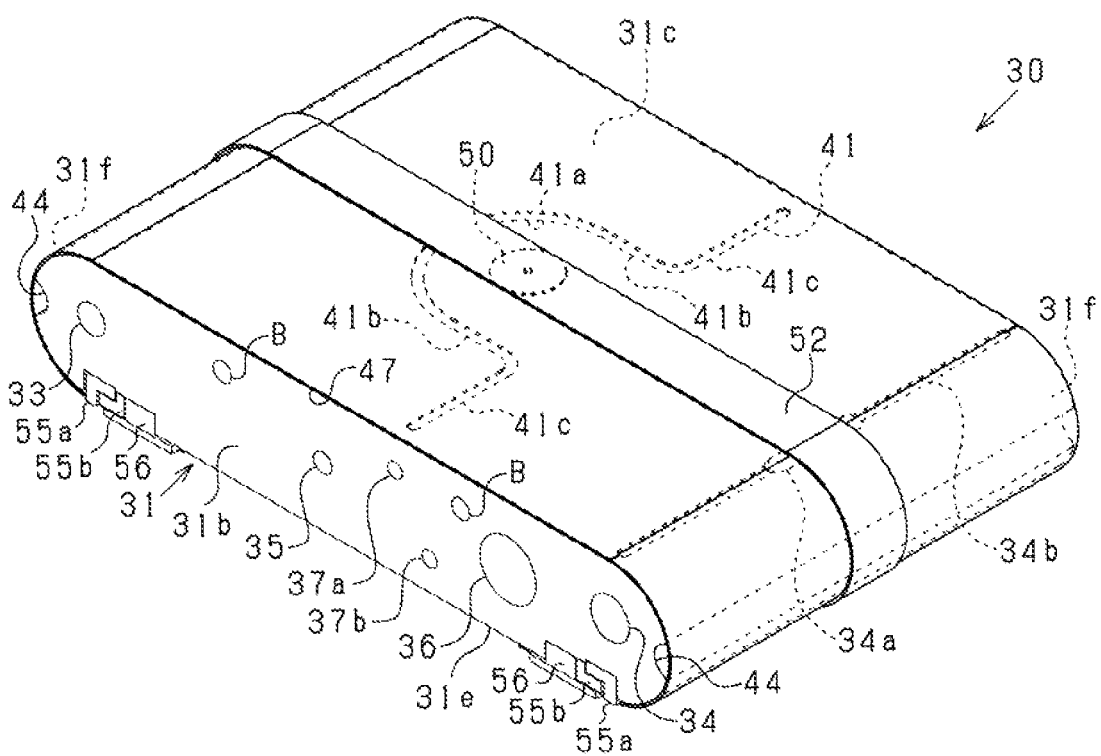
FIG. 3 is a perspective view showing a liquid control apparatus.
Figure 4:
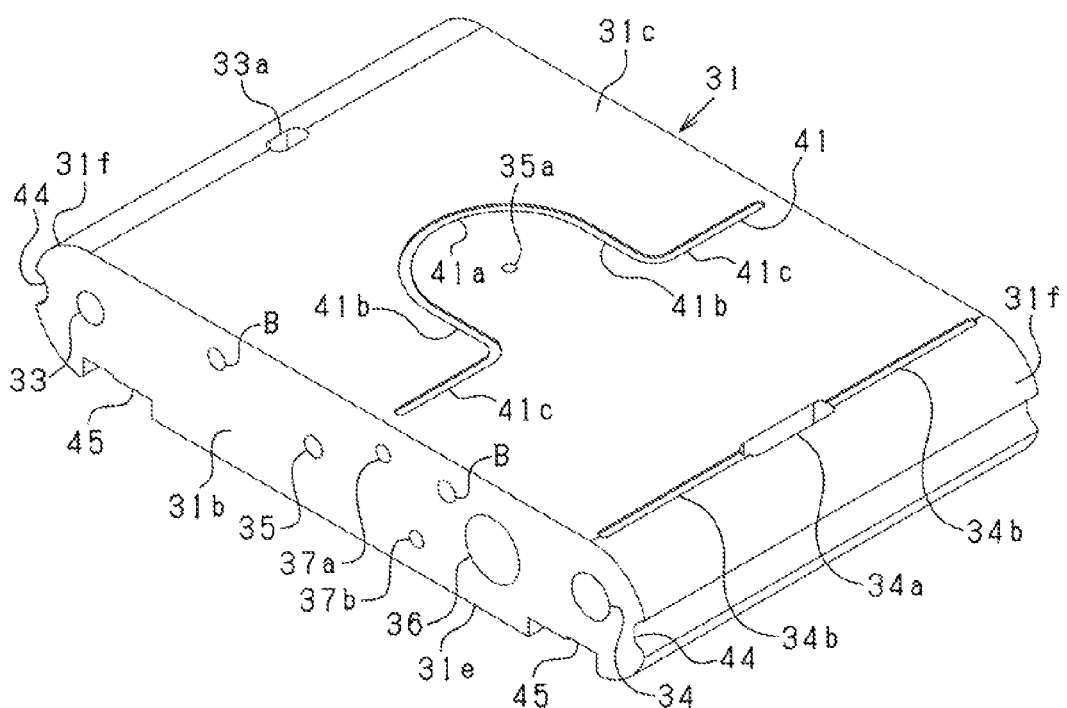
FIG. 4 is a perspective view showing a main body of the liquid control apparatus.

Next, a configuration of the liquid control apparatus 30 will be described in detail. FIG. 3 is a perspective view showing the liquid control apparatus 30, and FIG. 4 is a perspective view showing the main body 31 of the liquid control apparatus 30. As shown in the drawings, the liquid control apparatus 30 includes the main body 31, a mesh 47, a blocking member 50, a mesh band 52, mesh retainers 55a and 55b, and fixing members 56. The main body 31 is formed of a material exhibiting comparatively high corrosion resistance to chemicals and comparatively high chemical wettability. When the chemical is a hydrophobicity processing liquid, for example, the main body 31 is formed of a stainless steel material or an aluminum material.

The first main body flow passage 33 opens onto the upper surface 31c of the main body 31, and a gas introduction port 33a is formed in the upper surface 31c. The second main body flow passage 34 opens onto the upper surface 31c of the main body 31, and a gas discharge port 34a is formed in the upper surface 31c. Furthermore, the chemical flow passage 35 opens onto the upper surface 31c (a supply subject surface) of the main body 31, and a chemical supply port 35a is formed in the upper surface 31c.

The supply port 35a, the thermocouple insertion holes 37a and 37b (the thermocouples 83 and 84), and the heater insertion hole 36 (the heater 80) are provided between the introduction port 33a and the discharge port 34a in an expanse direction of the upper surface 31c. The supply port 35a is provided between the introduction port 33a and the discharge port 34a in the expanse direction of the upper surface 31c, or more specifically, between the introduction port 33a and the discharge port 34a but slightly closer to the introduction port 33a.

The supply port 35a is provided between the introduction port 33a and the thermocouple insertion holes 37a and 37b (a heater insertion hole 36) in the expanse direction of the upper surface 31c. In other words, the distance between the introduction port 33a and the supply port 35a is shorter than the distance between the introduction port 33a and the thermocouple insertions holes 37a and 37b in the lengthwise direction of the upper surface 31c.

The thermocouple insertion holes 37a and 37b, and the heater insertion hole 36 are provided between the supply port 35a and the discharge port 34a in the expanse direction of the upper surface 31c. In other words, the distance between the supply port 35a and the thermocouple insertion holes 37a and 37b (the heater insertion hole 36) is shorter than the distance between the supply port 35a and the discharge port 34a in the lengthwise direction of the upper surface 31c.

The thermocouple insertion holes 37a and 37b are provided in the main body 31 between the supply port 35a and the heater insertion hole 36 in the lengthwise direction of the upper surface 31c. The thermocouple insertion hole 37a is provided in the main body 31 between the supply port 35a and the thermocouple insertion hole 37b in the lengthwise direction of the upper surface 31c.

The discharge port 34a is formed to be larger than the introduction port 33a. More specifically, the discharge port 34a extends by a greater length than the introduction port 33a in a perpendicular direction (the widthwise direction of the upper surface 31c) to a direction extending from the introduction port 33a to the discharge port 34a.

A gas collecting groove 34b that communicates with the discharge port 34a is formed in the upper surface 31c of the main body 31. The gas collecting groove 34b extends in the widthwise direction of the upper surface 31c from respective ends of the discharge port 34a. The gas collecting groove 34b is provided over the entire length of the widthwise direction of the upper surface 31c. A width of the gas collecting groove 34b in a direction (the lengthwise direction of the upper surface 31c) extending from the introduction port 33a to the discharge port 34a is formed to be slightly narrower than a width of the discharge port 34a. A depth of the gas collecting groove 34b is set such that gas flowing in the direction from the introduction port 33a to the discharge port 34a can travel along the gas collecting groove 34b so as to be collected in the discharge port 34a. For example, the depth of the gas collecting groove 34b is set between 0.2 and 0.5 mm.

A suppression groove 41 (groove) for preventing the chemical from spreading from the supply port 35a to a side opposite to the heater insertion hole 36 (the heater 80) and a side opposite to the thermocouple insertion holes 37a and 37b (the thermocouples 83 and 84) is formed in the upper surface 31c of the main body 31 in the expanse direction (the lengthwise direction) of the upper surface 31c. The suppression groove 41 includes an arc part 41a, first rectilinear portions 41b, and second rectilinear portions 41c.

The arc part 41a is formed in the shape of a semicircular arc, and surrounds a periphery of the supply port 35a in the expanse direction of the upper surface 31c on sides excluding the sides of the heater insertion hole 36 and the thermocouple insertion holes 37a and 37b. In other words, the arc part 41a surrounds the half of the periphery of the supply port 35a on the side of an introduction port 33a (the half of the periphery on the side opposite to the discharge port 34a) in the expanse direction of the upper surface 31c.

The first rectilinear portions 41b extend in the expanse direction of the upper surface 31c from respective ends of the arc part 41a to the heater insertion hole 36 side. A length of the first rectilinear portions 41b is set to be substantially equal to a radius of the arc part 41a.

The second rectilinear portions 41c extend in the expanse direction of the upper surface 31c from end portions of the respective first rectilinear portions 41b to outer sides of the upper surface 31c in the widthwise direction of the upper surface 31c. A length of the second rectilinear portions 41c is set to be substantially equal to the length of the first rectilinear portions 41b. The second rectilinear portions 41c extend to end portions in the lengthwise direction of the upper surface 31c. A width of the suppression groove 41 is set between 0.75 and 5.0 mm, for example, and a depth of the suppression groove 41 is set between 0.2 and 0.5 mm, for example.

Engagement grooves 45 for engaging the mesh retainers 55a and 55b, and the fixing members 56 are formed in respective end portions in the lengthwise direction of the lower surface 31e of the main body 31. The engagement grooves 45 are formed to extend in a widthwise direction of the lower surface 31e at a predetermined width and a predetermined depth.

The mesh retainers 55a and 55b are formed in a rod shape having an "L" shaped cross-section. The fixing members 56 are formed in a rod shape having a "T" shaped cross-section. Lengths of the mesh retainers 55a and 55b, and the fixing members 56 are set to be equal to a widthwise direction length of the lower surface 31e.

The width and depth of the engagement groove 45 are set such that when the first mesh retainer 55a, the second mesh retainer 55b, and the fixing member 56 are attached in that order, these members are fixed. Note that the fixing member 56 may be a fastening member that fastens the second mesh retainer 55b to the main body 31.

Recessed portions 44 are formed in respective curved surfaces 31f of the main body 31 to extend rectilinearly in the widthwise direction of the upper surface 31c.

A mesh 47 (a mesh form body) woven into mesh form is provided around an outer periphery of the main body 31 so as to contact the upper surface 31c and the curved surfaces 31f.

The mesh 47 is formed in a rectangular shape that is large enough to cover the upper surface 31c and the curved surfaces 31f. More specifically, the widthwise direction length of the upper surface 31c matches a widthwise direction length of the mesh 47, while a lengthwise direction length of the mesh 47 is greater than a combined length of the lengthwise direction length of the upper surface 31c and respective lengths of the outer peripheries of the curved surfaces 31f.

The mesh 47 is wrapped around the upper surface 31c and the two curved surfaces 31f. As a result, the introduction port 33a, the supply port 35a, the suppression groove 41, the gas collecting groove 34b, and the discharge port 34a are covered by the mesh 47.

A mesh size of the mesh 47 is set at a size enabling the chemical to form a film easily in the openings of the mesh 47. For example, 100 mesh having 100 openings per inch is used. More specifically, in the mesh 47, a wire diameter is set at 0.1 mm and an inter-wire distance is set at 0.15 mm. The size of the mesh 47 is preferably set appropriately in accordance with the chemical wettability of the mesh 47, the chemical wettability of the main body 31, the viscosity of the chemical, and so on. Here, the width of the suppression groove 41 is set to be at least five times the inter-wire distance of the mesh 47, while the depth of the suppression groove 41 is set to be at least twice the wire diameter of the mesh 47. The mesh 47 is formed of a material exhibiting comparatively high corrosion resistance to chemicals and comparatively high chemical wettability. When the chemical is a hydrophobicity processing liquid, for example, the mesh 47 is formed of a stainless steel material.

The blocking member 50 is provided in a position corresponding to the supply port 35a so as to cover the supply port 35a. More specifically, the blocking member 50 (blocking member, guiding member) covers only the supply port 35a and the vicinity thereof, and is surrounded by the arc part 41a and the first rectilinear portions 41b of the suppression groove 41. The blocking member 50 is provided on an outer side of the mesh 47 so as to contact the mesh 47. In other words, the blocking member 50 contacts the mesh 47 on a side opposite to the main body 31 side such that the mesh 47 is sandwiched between the upper surface 31c of the main body 31 and the blocking member 50.

Hence, the blocking member 50 does not contact the upper surface 31c of the main body 31, and therefore a chemical flow passage is secured by the mesh 47 between the upper surface 31c and the blocking member 50. The blocking member 50 is also formed of a material that exhibits comparatively high corrosion resistance to chemicals and comparatively high chemical wettability.

The mesh band 52, which is woven into mesh form, is provided around the outer periphery of the main body 31 (the mesh 47) so as to extend in the direction from the introduction port 33a to the discharge port 34a (the lengthwise direction of the upper surface 31c).

The mesh band 52 (guiding member) covers the introduction port 33a, the supply port 35a (the blocking member 50), and the discharge port 34a. In other words, the mesh band 52 extends in the expanse direction of the upper surface 31c from the introduction port 33a toward the supply port 35a, the thermocouple insertion holes 37a and 37b (the thermocouples 83, 84), the heater insertion hole 24 (the heater 80), and the discharge port 34a, in that order.

The mesh band 52 is provided on the outer side of the mesh 47 and the blocking member 50 so as to contact the mesh 47 and the blocking member 50. In other words, the mesh band 52 contacts the mesh 47 on the side opposite to the main body 31 side such that the mesh 47 is sandwiched between the upper surface 31c of the main body 31 and the mesh band 52. Further, the blocking member 50 is sandwiched between the mesh 47 and the mesh band 52.

The mesh band 52 is formed in a rectangular shape (a strip shape) that is large enough to cover the introduction port 33a and the blocking member 50 (the supply port 35a). More specifically, a diameter of the blocking member 50 and a widthwise direction length of the mesh band 52 are substantially equal, while a widthwise direction length of the mesh band 52 is shorter than an interval between the two first rectilinear portions 41b of the suppression groove 41. A lengthwise direction length of the mesh band 52 is greater than the combined length of the lengthwise direction length of the upper surface 31c and the respective lengths of the outer peripheries of the curved surfaces 31f.

The mesh band 52 is wrapped around the upper surface 31c and the two curved surfaces 31f. A mesh size of the mesh band 52 is likewise set at a size enabling the chemical to form a film easily in the openings of the mesh band 52. For example, 100 mesh having 100 openings per inch is used. The mesh band 52 is also formed of a material exhibiting comparatively high corrosion resistance to chemicals and comparatively high chemical wettability.

Respective lengthwise direction ends of the mesh 47 and the mesh band 52 are fixed by the respective mesh retainers 55a and 55b, and the fixing members 56. More specifically, in the engagement grooves 45, the end portions of the mesh 47 and the mesh band 52 are retained by the first mesh retainers 55a, while the first mesh retainers 55a are retained by the second mesh retainers 55b.

The end portions of the mesh 47 and the mesh band 52 are led to the outside from between the first mesh retainers 55a and the second mesh retainers 55b. In other words, the end portions of the mesh 47 and the mesh band 52 are respectively sandwiched between the first mesh retainers 55a and the second mesh retainers 55b.

Then, in a state where the second mesh retainers 55b are respectively retained by the fixing members 56, the fixing members 56 are engaged to the respective engagement grooves 45. As a result, the mesh retainers 55a and 55b, and the fixing members 56 are engaged to the engagement grooves 45 fixedly. Although not shown in the drawings, when the fixing member 56 is constituted by a screw, the second mesh retainer 55b is fastened to the main body 31 by the screw.

Here, the mesh 47 and the mesh band 52 are fixed while being stretched in the respective lengthwise directions thereof. Therefore, the mesh 47 contacts the upper surface 31c and the curved surfaces 31f of the main body 31 closely, and the mesh band 52 contacts the mesh 47 closely. Further, the blocking member 50 is in a state of close contact with the mesh 47 and the mesh band 52.

Figure 5:
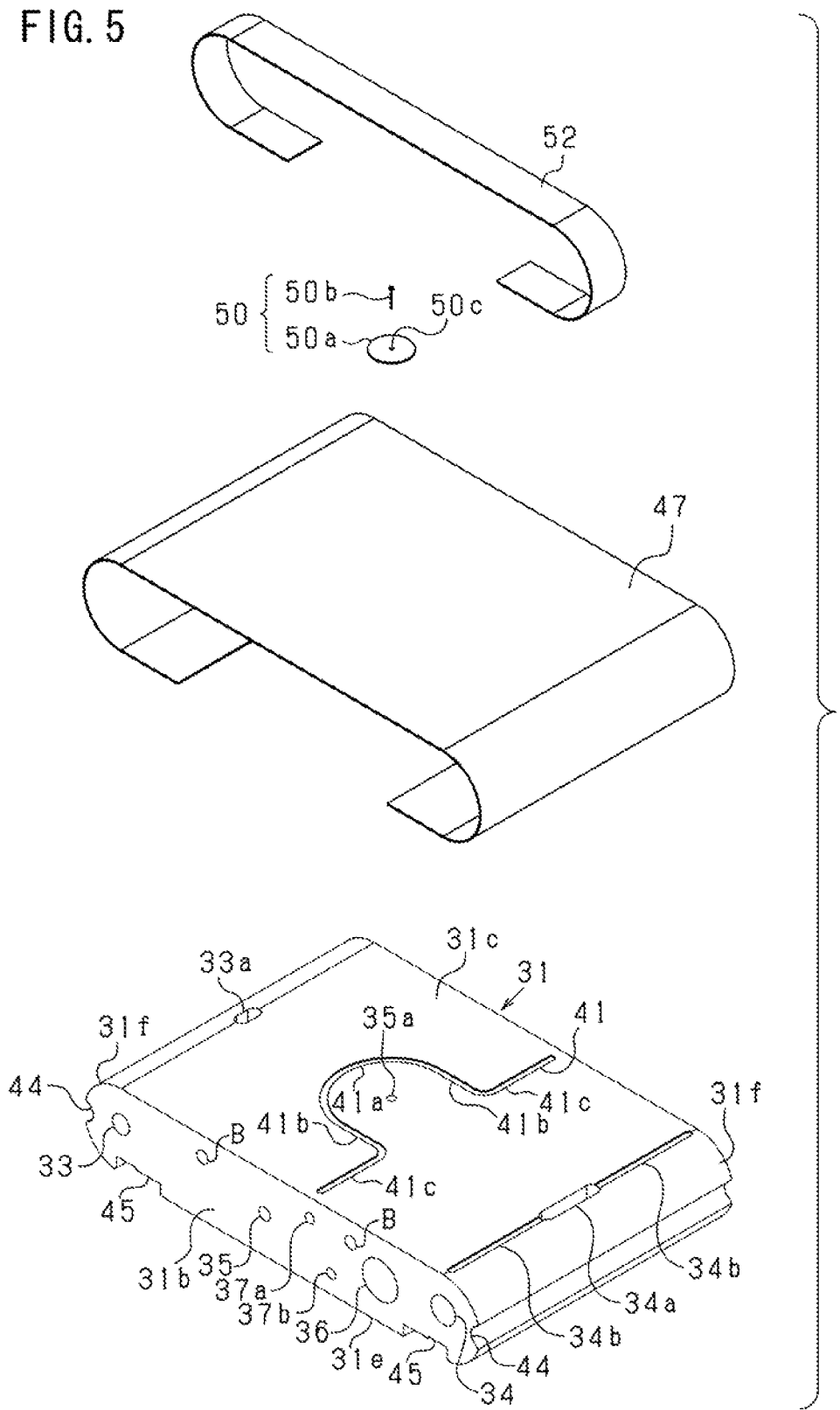
FIG. 5 is an exploded perspective view of the liquid control apparatus.

Next, procedures for assembling the liquid control apparatus 30 will be described. FIG. 5 is an exploded perspective view of the liquid control apparatus 30. As shown in the drawing, the blocking member 50 includes a disc-shaped disc portion 50a and a needle-shaped pin 50b. A through hole 50c is formed in a center of the disc portion 50a (a first part). One end of the pin 50b (a second part) forms a sharp end portion sharpened into a needle shape, while the other end forms a head portion having a larger diameter than a remaining part. A diameter of the head portion of the pin 50b is larger than a diameter of the through hole 50c, whereas a diameter of the part of the pin 50b other than the head portion is smaller than the diameter of the through hole 50c. A diameter of the sharp end portion of the pin 50b is smaller than the inter-wire distance, i.e. 0.15 mm, of the mesh 47.

First, the mesh 47 is wrapped around the outer periphery of the main body 31 such that the lengthwise direction of the mesh 47 is aligned with the lengthwise direction of the upper surface 31c of the main body 31. At this time, the mesh 47 covers the entirety of the upper surface 31c and the curved surfaces 31f with surplus at either end.

Next, the disc portion 50a of the blocking member 50 is disposed to cover the supply port 35a from the outer side of the mesh 47. At this time, a center position of the supply port 35a is aligned with a center position (the position of the through hole 50c) of the disc portion 50a. The pin 50b is then inserted into the through hole 50c in the disc portion 50a from the sharp end portion and inserted into the supply port 35a through the mesh 47. The diameter of the sharp end portion of the pin 50b is smaller than the inter-wire distance of the mesh 47, and therefore the sharp end portion can be inserted between adjacent wires of the mesh 47. The head portion of the pin 50b is then brought into contact with the disc portion 50a, whereby insertion of the pin 50b is complete.

Next, the mesh band 52 is wrapped around the outer periphery of the main body 31 such that the lengthwise direction of the mesh band 52 is aligned with the lengthwise direction of the upper surface 31c of the main body 31. More specifically, the mesh band 52 is wrapped so as to overlap the introduction port 33a, the supply port 35a (the blocking member 50), and the discharge port 34a. At this time, the mesh band 52 covers the upper surface 31c and the curved surfaces 31f with surplus at either end.

Next, as shown in FIGS. 2B, 2C, and 3, the respective end portions of the mesh 47 and the mesh band 52 are initially retained in the engagement grooves 45 by the first mesh retainers 55a. In this state, or in a state where the first mesh retainers 55a are retained by the second mesh retainers 55b, the mesh 47 and the mesh band 52 are stretched in the respective lengthwise directions thereof. As a result, wrinkles in the mesh 47 and the mesh band 52 are stretched and tension is generated in the mesh 47 and the mesh band 52. The mesh retainers 55a and 55b are then fixed by the fixing members 56, whereby assembly of the liquid control apparatus 30 is complete.

As described above, the liquid control apparatus 30 thus assembled is attached to the side face 20b of the second housing 20 using a fastening member in the through hole B formed in the main body 31. As a result, a gap having an oval tubular shape is formed between the inner peripheral surface of the first housing 11 and the main body 31.

When the mesh 47 and the mesh band 52 are wrapped around the outer periphery of the main body 31 and fixed, gaps are formed between the mesh 47 (mesh band 52) and the recessed portions 44 in the curved surfaces 31*f*. Hence, insertion members 57 are inserted between the main body 31 and the mesh 47 (mesh band 52) along an axial direction of the main body 31 (the widthwise direction of the upper surface 31*c*) so as to engage with the recessed portions 44.

The insertion member 57 is formed in a round bar shape, and a radius of a cross-section of the round bar is set to be substantially equal to a radius of curvature of the recessed portion 44. A tip end portion of the insertion member 57 is formed to be slightly narrower than a remaining part, and the insertion member 57 is inserted from the tip end portion while pressing the mesh 47 and the mesh band 52 into the recessed portion 44. Accordingly, the gap between the recessed portion 44 and the mesh 47 (mesh band 52) is reduced, enabling an increase in the tension generated in the mesh 47 and the mesh band 52. As a result, the mesh 47 and the mesh band 52 are forcefully brought into close contact with the main body 31.

Figure 6:
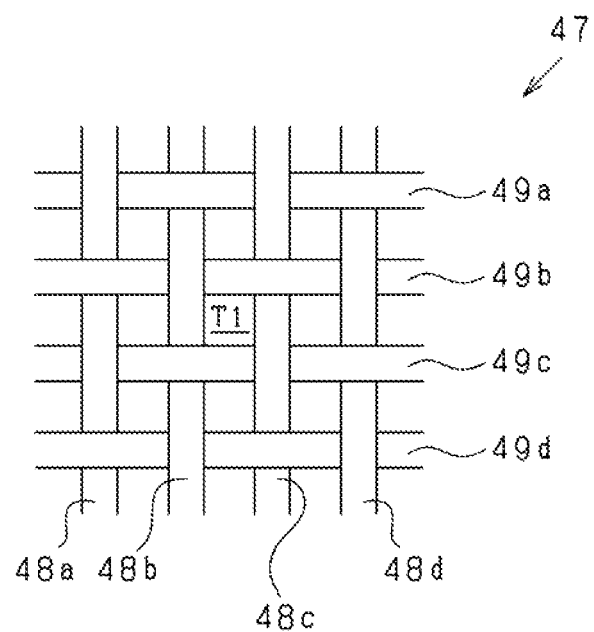
FIG. 6 is an enlarged plan view of a mesh.

Next, a principle by which the chemical contacting the upper surface 31*c* of the main body 31 is caused to spread by the mesh 47, the mesh band 52, and the blocking member 50 will be described. FIG. 6 is an enlarged plan view of the mesh 47. The mesh 47 is formed by knitting (weaving) vertical wires 48*a*, 48*b*, 48*c* and 48*d*, and horizontal wires 49*a*, 49*b*, 49*c* and 49*d* into mesh form.

Mesh spaces surrounded by the vertical wires and the horizontal wires when seen from above are formed in the mesh 47. The mesh spaces take the shape of a rectangular parallelepiped (a square shape when seen from above), and are formed at equal intervals in a vertical direction and a horizontal direction of the mesh 47. For example, a mesh space T1 is a minute space (0.15 mm×0.15 mm×the thickness of the mesh 47) surrounded by the two vertical wires 48*b* and 48*c*, and the two horizontal wires 49*b* and 49*c*.

Since the mesh space T1 is a minute space, a comparatively large intermolecular force acts between the wires 48*b*, 48*c*, 49*b* and 49*c*, and the chemical. As a result, the chemical is suctioned into the mesh space T1, whereby a chemical film is formed so as to close the mesh space T1 (a capillary action). In this condition, the chemical is suctioned into each mesh space, and therefore an action by which the chemical attempts to spread over the surface of the mesh 47 is comparatively small.

Figure 7:
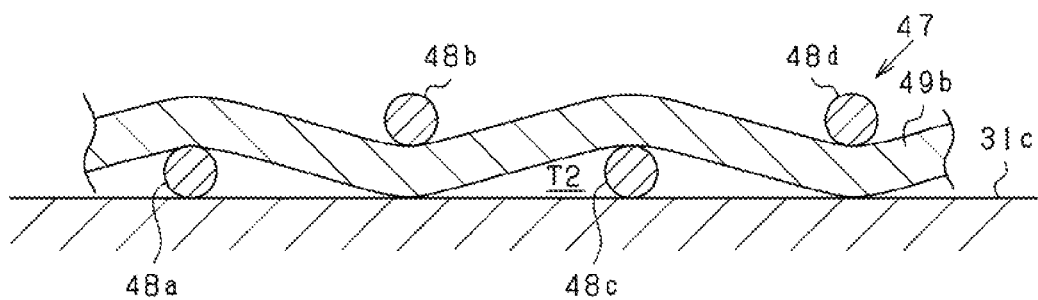
FIG. 7 is an enlarged sectional view showing an upper surface of the main body and the mesh.

FIG. 7 is an enlarged sectional view showing the upper surface 31*c* of the main body 31 and the mesh 47. As shown in the drawing, a flow space T2 surrounded by the upper surface 31*c* of the main body 31, the vertical wire, and the horizontal wire when seen from the side is formed between the upper surface 31*c* and the mesh 47. The flow space T2 connects gaps between the upper surface 31*c* and the vertical and horizontal wires, and is formed to extend along the upper surface 31*c*.

In parts where the vertical wires 48*a*, 48*b*, 48*c* and 48*d* contact the upper surface 31*c* (intersecting parts between the wires), the horizontal wires 49*a*, 49*b*, 49*c* and 49*d* are separated from the upper surface 31*c*. In parts where the horizontal wires 49*a*, 49*b*, 49*c* and 49*d* contact the upper surface 31*c* (intersecting parts between the wires), on the other hand, the vertical wires 48*a*, 48*b*, 48*c* and 48*d* are separated from the upper surface 31*c*. Hence, the flow space T2 extends continuously along the upper surface 31*c* without being blocked by the vertical wires and horizontal wires.

A large number of minute interfaces are formed between the upper surface 31*c* and the vertical and horizontal wires. Therefore, the chemical supplied to the upper surface 31*c* is caused to spread over the upper surface 31*c* through the flow space T2 by interfacial tension in the large number of minute interfaces (a capillary action). Further, the chemical possesses wettability relative to the upper surface 31*c*, the vertical wires, and the horizontal wires, and therefore spreading of the chemical over the upper surface 31*c* is promoted.

Figure 8:
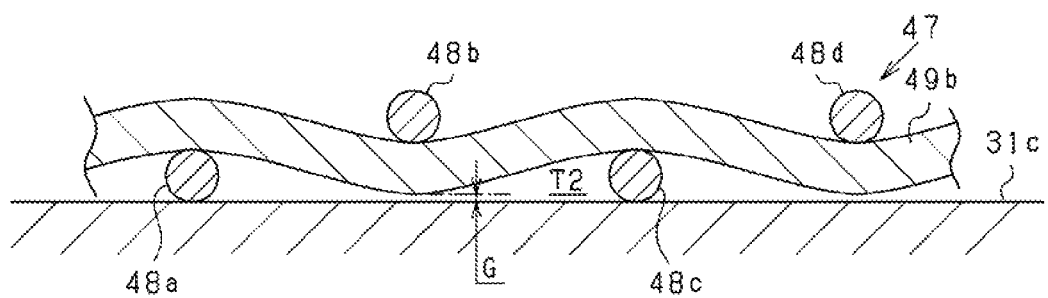
FIG. 8 is an enlarged sectional view showing the upper surface of the main body and the mesh.

FIG. 8 is an enlarged sectional view showing the upper surface 31*c* of the main body 31 and the mesh 47. Here, a condition in which a part of the horizontal wire 49*b* is separated from the upper surface 31*c* to form a gap G is shown. Likewise in this condition, the chemical is caused to spread through the flow space T2 by interfacial tension. In other words, the vertical wires and the horizontal wires may be partially separated from the upper surface 31*c*.

Figure 9:
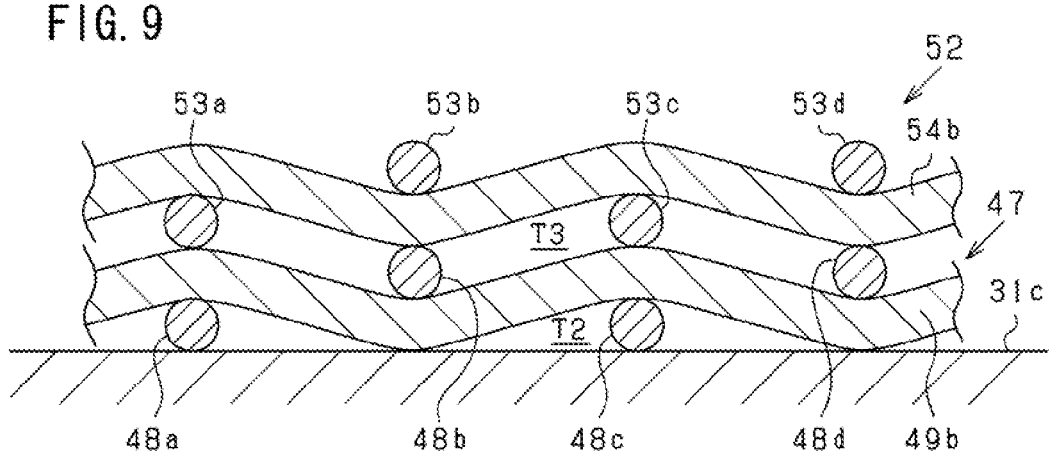
FIG. 9 is an enlarged sectional view showing the upper surface of the main body, the mesh, and a mesh band.

FIG. 9 is an enlarged sectional view showing the upper surface 31*c* of the main body 31, the mesh 47, and the mesh band 52. As shown in the drawing, in addition to the flow space T2, a flow space T3 surrounded by the vertical wires and horizontal wires of the mesh 47 and the vertical wires and horizontal wires of the mesh band 52 when seen from the side is formed between the mesh 47 and the mesh band 52. The flow space T3 connects gaps between the vertical wires and horizontal wires of the mesh 47 and the vertical wires and horizontal wires of the mesh band 52, and extends substantially parallel to the upper surface 31*c*.

In parts where vertical wires 53*a*, 53*b*, 53*c* and 53*d* of the mesh band 52 contact the horizontal wires of the mesh 47 (intersecting parts between the wires), horizontal wires of the mesh band 52 are separated from the horizontal wires of the mesh 47. In parts where the horizontal wires of the mesh band 52 contact the vertical wires of the mesh 47 (intersecting parts between the wires), on the other hand, vertical wires 53*a*, 53*b*, 53*c* and 53*d* of the mesh band 52 are separated from the vertical wires of the mesh 47. Hence, the flow space T3 extends continuously substantially parallel to the upper surface 31*c* without being blocked by the vertical wires and horizontal wires.

A large number of minute interfaces are formed between the vertical and horizontal wires of the mesh 47 and the vertical and horizontal wires of the mesh band 52. Therefore, the chemical supplied to the upper surface 31*c* is caused to spread over the upper surface 31*c* through the flow space T2 and caused to spread substantially parallel to the upper surface 31*c* through the flow space T3 by interfacial tension between the large number of minute interfaces (a capillary action). Further, the chemical possesses wettability relative to the upper surface 31*c*, the vertical wires and horizontal wires of the mesh 47, and the vertical wires and horizontal wires of the mesh band 52, and therefore spreading of the chemical is promoted. Note that in the drawing, positions of the vertical wires of the mesh 47 and the vertical wires of the mesh band 52 and positions of the horizontal wires of the mesh 47 and the horizontal wires of the mesh band 52 are shown to be aligned, but these positions may deviate from each other.

Figure 10:
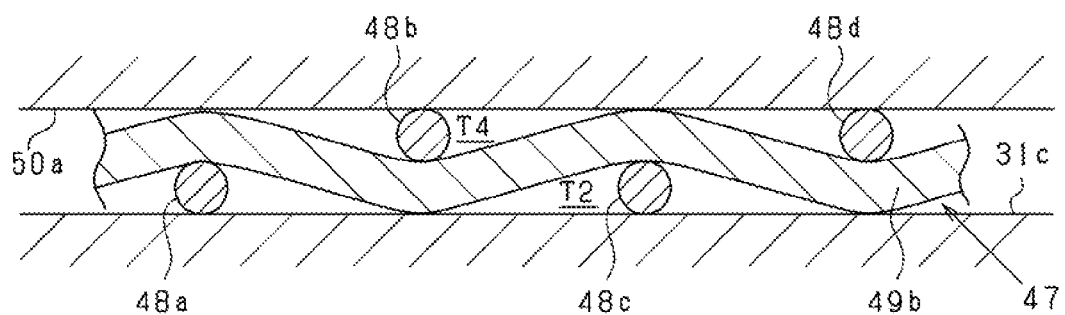
FIG. 10 is an enlarged sectional view showing the upper surface of the main body, the mesh, and a blocking member.

FIG. 10 is an enlarged sectional view showing the upper surface 31*c* of the main body 31, the mesh 47, and the blocking member 50. As shown in the drawing, in addition to the flow space T2, a flow space T4 surrounded by the disc portion 50*a* of the blocking member 50 and the vertical wires and horizontal wires when seen from the side is formed between the disc portion 50*a* and the mesh 47. The flow space T4 is formed similarly to the flow space T2 as a space which connects gaps between a lower surface of the disc portion 50*a* and the vertical and horizontal wires so as to extend along the lower surface of the disc portion 50a.

Hence, the chemical supplied to the upper surface 31c is caused to spread over the upper surface 31c through the flow space T2 and caused to spread over the lower surface of the disc portion 50a through the flow space T4 by interfacial tension between the large number of minute interfaces (a capillary action). Further, the chemical possesses wettability relative to the upper surface 31c, the lower surface of the disc portion 50a, and the vertical wires and horizontal wires, and therefore spreading of the chemical is promoted.

Next, referring to FIGS. 1A, 1B and 3, an action of the liquid vaporizer 10 will be described. Here, a case in which the chemical (a hydrophobicity processing liquid, for example) vaporized by the liquid control apparatus 30 is mixed with an inert gas (nitrogen, for example) before being supplied to a following apparatus will be described as an example.

When the inert gas is introduced from the first gas pipe 26b, the inert gas is introduced into the columnar space S in the first housing 11 from the introduction port 33a in the main body 31 through the first gas flow passage 21 and the first main body flow passage 33. The inert gas flows through a gap formed between the inner peripheral surface of the first housing 11 and the main body 31 of the liquid control apparatus 30, intermixes with the hydrophobicity processing liquid vaporized by the liquid control apparatus 30, and then flows into the discharge port 34a. The mixed gas flowing into the discharge port 34a is discharged from the second gas pipe 27b via the second main body flow passage 34 and the second gas flow passage 22. The second gas pipe 27b is connected to the following apparatus, and therefore the mixed gas discharged from the second gas pipe 27b is supplied to the following apparatus.

When the chemical is supplied from the chemical pipe 28b, the chemical is supplied to the upper surface 31c from the supply port 35a in the main body 31 through the chemical flow passages 23 and 35. At this time, the chemical supplied from the supply port 35a impinges on the blocking member 50 covering the supply port 35a, and therefore spurting of the chemical through the mesh 47 and the mesh band 52 is suppressed. Further, the pin 50b of the blocking member 50 is inserted into the supply port 35a, and therefore the blocking member 50 is prevented from deviating from the supply port 35a even when a pressure of the chemical acts on the blocking member 50. The pin 50b can also be used to position the blocking member 50 relative to the supply port 35a.

As shown in FIG. 10, between the upper surface 31c of the main body 31 and the disc portion 50a of the blocking member 50, the supplied chemical is caused to spread over the upper surface 31c through the flow space T2 and caused to spread over the lower surface of the disc portion 50a through the flow space T4 by the interfacial tension between the large number of minute interfaces. Hence, the chemical spreads more quickly in this part than in the part where only the mesh 47 is provided on the upper surface 31c.

The chemical spreads further toward the periphery under the disc portion 50a of the blocking member 50. In the part where only the mesh 47 is provided on the upper surface 31c, as shown in FIG. 7, the chemical is caused to spread over the upper surface 31c through the flow space T2 by the interfacial tension between the large number of minute interfaces. In the part where the mesh 47 and the mesh band 52 are provided on the upper surface 31c, meanwhile, as shown in FIG. 9, the chemical is caused to spread over the upper surface 31c through the flow space T2 and caused to spread substantially parallel to the upper surface 31c through the flow space T3 by the interfacial tension between the large number of minute interfaces. Hence, the chemical that flows under the disc portion 50a of the blocking member 50 spreads preferentially along the mesh band 52.

Further, the part of the chemical that spreads to the periphery of the blocking member 50 along the upper surface 31c reaches the suppression groove 41 in the upper surface 31c. In the part where the suppression groove 41 is formed, no interfaces are formed between the upper surface 31c and the mesh 47, and therefore spreading of the chemical is suppressed. Here, the arc part 41a of the suppression groove 41 surrounds the periphery of the supply port 35a in the expanse direction of the upper surface 31c on sides excluding the sides of the heater insertion hole 36 (the heater 80) and the thermocouple insertion holes 37a and 37b (the thermocouples 83 and 84). Therefore, spreading of the chemical in directions other than the sides of the heater 80, and the thermocouples 83 and 84 is suppressed. As a result, an amount of the chemical that flows to the sides of the heater 80, and the thermocouples 83 and 84 in the expanse direction of the upper surface 31c is increased such that spreading of the chemical to the sides of the heater 80, and the thermocouples 83 and 84 is promoted. Spreading of the chemical to the sides of the heater 80, and the thermocouples 83 and 84 in the expanse direction of the upper surface 31c is also promoted by the first rectilinear portions 41b and second rectilinear portions 41c of the suppression groove 41.

The heater 80 is inserted into the heater insertion hole 36, and the upper surface 31c of the main body 31 is heated by the heater 80. Here, spreading of the chemical to the heater 80 side in the expanse direction of the upper surface 31c is promoted by the mesh band 52 and the suppression groove 41, and therefore the efficiency with which the chemical is heated by the heater 80 can be improved. Further, the mesh band 52 is formed by being woven into mesh form, and therefore evaporation of the chemical via the mesh band 52 is promoted in comparison with a case in which the mesh band 52 is formed in plate form or film form. Hence, with the mesh band 52, spreading of the chemical to the heater 80 side can be promoted while ensuring that the chemical evaporates favorably.

When the chemical supplied to the upper surface 31c evaporates, the temperature of the upper surface 31c is reduced by resulting vaporization heat. Therefore, by detecting the temperature in the vicinity of the upper surface 31c using the first thermocouple 83, a degree of vaporization of the chemical can be calculated. Here, spreading of the chemical to the first thermocouple 83 side in the lengthwise direction of the upper surface 31c is promoted by the mesh band 52 and the suppression groove 41, and therefore the temperature reduction on the upper surface 31c due to vaporization of the chemical is reflected with great sensitivity in a detection value of the first thermocouple 83. Accordingly, the precision with which the degree of vaporization of the chemical is calculated can be improved. Note that the temperature of a position close to the lower surface 31e of the main body 31 can be detected using the second thermocouple 84, and a resulting detection value can be used to control heating of the upper surface 31c by the heater 80.

Further, the inert gas introduced from the introduction port 33a travels over the supply port 35a, the first thermocouple 83, and the heater 80 in that order, and is then discharged from the discharge port 34a. Therefore, spreading of the chemical from the supply port 35a to the sides of the heater 80 and the thermocouples 83 and 84 can also be promoted by the inert gas.

The embodiment described in detail above has the following advantages.

The mesh 47 is woven into mesh form and provided to contact the upper surface 31c of the main body 31, and therefore a plurality of interfaces are formed between the upper surface 31c and the mesh 47. Therefore, the chemical supplied to the upper surface 31c is caused to spread over the upper surface 31c by the interfacial tension between the plurality of interfaces.

Here, the mesh band 52 is provided to contact the mesh 47 on the side opposite to the main body 31, and therefore a plurality of interfaces are also formed between the mesh 47 and the mesh band 52. Hence, the chemical can also be caused to spread between the mesh 47 and the mesh band 52 by interfacial tension. Hence, spreading of the chemical can be promoted in the part provided with the mesh band 52 over other parts. As a result, by adjusting the arrangement of the mesh band 52, the chemical contacting the upper surface 31c can be caused to spread preferentially in a desired direction.

The mesh band 52 is formed by being woven into mesh form, and therefore evaporation of the chemical via the mesh band 52 can be promoted in comparison with a case where the mesh band 52 is formed in plate form or film form.

The mesh 47 and the mesh band 52 are provided to cover the supply port 35a, and therefore the chemical supplied from the supply port 35a is immediately caused to spread preferentially over the mesh band 52. Hence, the chemical supplied from the supply port 35a can be caused to spread in the desired direction efficiently.

The disc portion 50a of the blocking member 50 formed in plate form is provided to cover the supply port 35a. Therefore, the chemical supplied from the supply port 35a can be prevented from spurting through the mesh 47 and the mesh band 52.

Only the supply port 35a and the vicinity thereof are covered by the blocking member 50, and therefore a situation in which evaporation of the chemical is impaired by the blocking member 50 can be prevented from occurring while suppressing spurting of the chemical supplied from the supply port 35a.

The pin 50b that projects from the disc portion 50a of the blocking member 50 is inserted into the supply port 35a, and therefore the blocking member 50 can be prevented from deviating from the supply port 35a even when the pressure of the chemical acts on the blocking member 50. Furthermore, the pin 50b can be used to position the blocking member 50 relative to the supply port 35a.

The mesh band 52 extends from the supply port 35a toward the heater 80 in the expanse direction of the upper surface 31c, and therefore the chemical supplied from the supply port 35a can be caused to spread preferentially in the direction of the heater 80. As a result, the chemical can be heated efficiently by the heater 80.

Spreading of the chemical from the supply port 35a to the side opposite to the heater 80 in the expanse direction of the upper surface 31c is suppressed by the suppression groove 41 provided in the upper surface 31c. By suppressing spreading of the chemical to the side opposite to the heater 80 in the expanse direction of the upper surface 31c, spreading of the chemical to the side of the heater 80 can be promoted. As a result, heating of the chemical by the heater 80 can be promoted. Moreover, the arc part 41a of the suppression groove 41 surrounds the periphery of the supply port 35a in the expanse direction of the upper surface 31c on sides excluding the side of the heater 80, and therefore spreading of the chemical in directions other than the side of the heater 80 is suppressed. As a result, spreading of the chemical to the side of the heater 80 can be further promoted.

Inert gas is introduced from the interior of the main body 31 into the columnar space S on the periphery of the upper surface 31c through the introduction port 33a, and the inert gas is discharged from the columnar space S into the interior of the main body 31 through the discharge port 34a. At this time, spreading of the chemical contacting the upper surface 31c in a flow direction of the inert gas is promoted. Further, the inert gas introduction port 33a and discharge port 34a are provided on either side of the heater 80 in the expanse direction of the upper surface 31c, and therefore spreading of the chemical in a direction passing through the heater 80 can be promoted. As a result, heating of the chemical by the heater 80 can be promoted.

The supply port 35a is provided in the main body 31 between the inert gas introduction port 33a and the heater 80 in the lengthwise direction of the upper surface 31c, and therefore spreading of the chemical to the side of the heater 80 is promoted by the flow of the inert gas from the introduction port 33a to the discharge port 34a. Hence, the chemical supplied from the supply port 35a can be caused to spread efficiently to the side of the heater 80 in the lengthwise direction of the upper surface 31c.

The mesh band 52 extends toward the thermocouples 83 and 84 in the expanse direction of the upper surface 31c, and therefore the chemical contacting the upper surface 31c can be caused to spread preferentially in the direction of the thermocouples 83 and 84. As a result, the temperature reduction on the upper surface 31c due to vaporization of the chemical is reflected with great sensitivity in the detection value of the thermocouples 83 and 84, and therefore the precision with which the degree of vaporization of the chemical is calculated can be improved. Furthermore, the mesh band 52 extends toward the thermocouples 83 and 84 from the supply port 35a in the expanse direction of the upper surface 31c, and therefore the chemical supplied from the supply port 35a can be caused to spread preferentially in the direction of the thermocouples 83 and 84. As a result, the chemical spreads from the supply port 35a in the direction of the thermocouples 83 and 84 with stability, and therefore the temperature reduction on the upper surface 31c due to vaporization of the chemical can be stabilized.

Spreading of the chemical from the supply port 35a to the side opposite to the thermocouples 83 and 84 in the expanse direction of the upper surface 31c is suppressed by the suppression groove 41 provided in the upper surface 31c. By suppressing spreading of the chemical to the side opposite to the thermocouples 83 and 84 in the expanse direction of the upper surface 31c, spreading of the chemical to the side of the thermocouples 83 and 84 can be promoted. As a result, the precision with which the degree of vaporization of the chemical is calculated can be improved. Moreover, the arc part 41a of the suppression groove 41 surrounds the periphery of the supply port 35a in the expanse direction of the upper surface 31c on sides excluding the side of the thermocouples 83 and 84, and therefore spreading of the chemical in directions other than the side of the thermocouples 83 and 84 is suppressed. As a result, spreading of the chemical to the side of the thermocouples 83 and 84 in the expanse direction of the upper surface 31c can be further promoted.

The inert gas is introduced into the columnar space S on the periphery of the upper surface 31c from the interior of the main body 31 through the introduction port 33a, and discharged to the interior of the main body 31 from the columnar space S through the discharge port 34a. At this time, spreading of the chemical contacting the upper surface 31c in the flow direction of the inert gas is promoted. Further, the thermocouples 83 and 84 are provided between the inert gas introduction port 33a and discharge port 34a in the expanse direction of the upper surface 31c, and therefore spreading of the chemical in a direction passing through the thermocouples 83 and 84 can be promoted. As a result, the precision with which the degree of vaporization of the chemical is calculated can be improved.

The supply port 35a is provided in the main body 31 between the inert gas introduction port 33a and the thermocouples 83 and 84 in the lengthwise direction of the upper surface 31c, and therefore spreading of the chemical to the side of the thermocouples 83 and 84 is promoted by the flow of the inert gas from the introduction port 33a to the discharge port 34a. As a result, the chemical supplied from the supply port 35a can be caused to spread efficiently to the side of the thermocouples 83 and 84 in the expanse direction of the upper surface 31c.

Note that the embodiment described above may be implemented after being modified as follows. Identical members to the above embodiment have been allocated identical reference symbols, and description thereof has been omitted.

Figure 11:
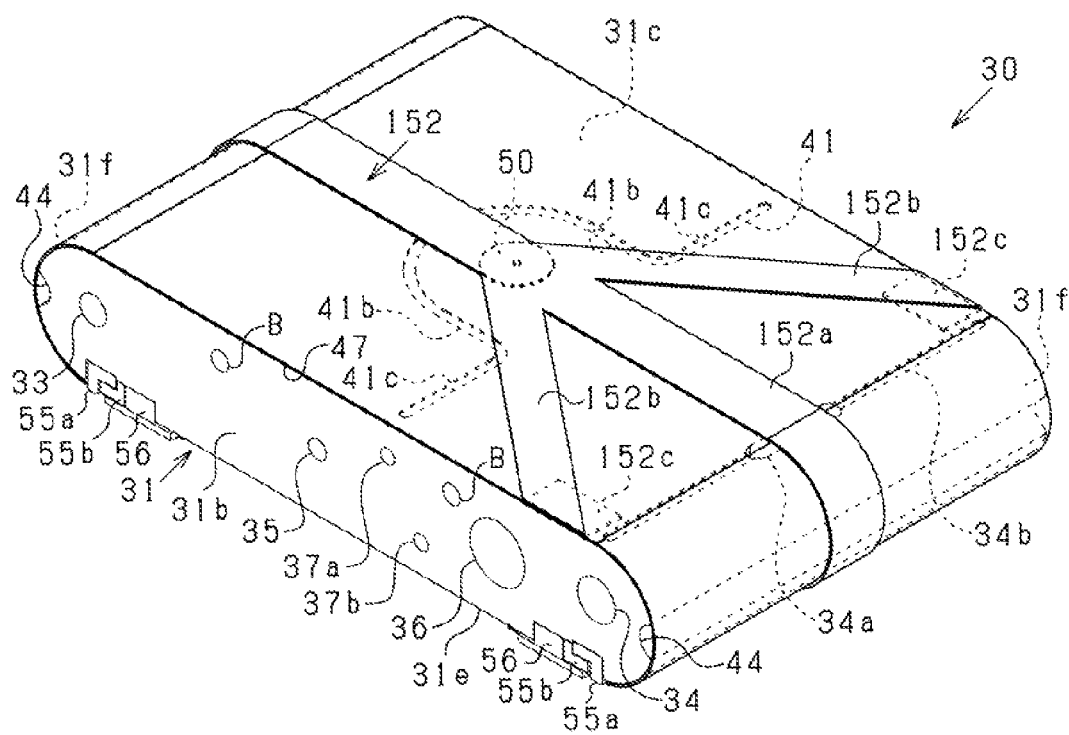
FIG. 11 is a perspective view showing a modified example of the mesh band.

FIG. 11 is a perspective view showing a modified example of the mesh band 52. As shown in the drawing, a mesh band 152 includes a main body portion 152a corresponding to the mesh band 52 shown in FIG. 3, branch portions 152b branching from the main body portion 152a, and end portions 152c. The branch portions 152b branch diagonally in the direction of the heater insertion hole 36 (the heater 80) from a position of the main body portion 152a that overlaps the blocking member 50 (the supply port 35a of the main body 31) in the expanse direction of the upper surface 31c. The end portions 152c of the branch portions 152b are bent and inserted between the upper surface 31c of the main body 31 and the mesh 47. With this configuration, the chemical supplied from the supply port 35a can be caused to spread in the expanse direction of the upper surface 31c preferentially toward the main body portion 152a and the two branch portions 152b. Accordingly, the chemical can be caused to spread more widely over a range in which the heater 80 is provided. As a result, the efficiency with which the chemical is heated by the heater 80 can be improved. Further, by bending the end portions 152c of the branch portions 152b and inserting the end portions 152c into gaps, the branch portions 152b can be held in close contact with the mesh 47 more easily.

Figure 12:
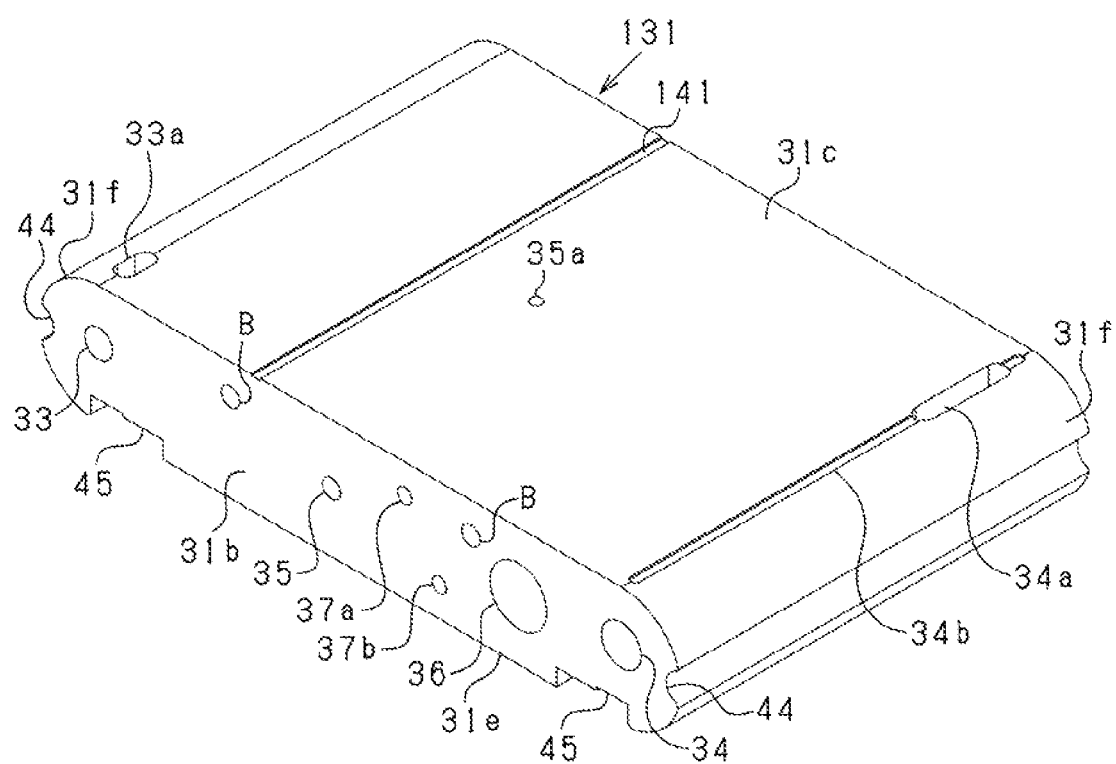
FIG. 12 is a perspective view showing a modified example of the main body of the liquid control apparatus.

FIG. 12 is a perspective view showing a modified example of the main body 31 of the liquid control apparatus 30. As shown in the drawing, the introduction port 33a and the discharge port 34a are formed in a main body 131 on a diagonal of the upper surface 31c. Likewise with this configuration, the inert gas introduced from the introduction port 33a passes over the supply port 35a, the thermocouple insertion holes 37a and 37b (the thermocouples 83 and 84), and the heater insertion hole 36 (the heater 80) in that order, and is then discharged from the discharge port 34a. As a result, spreading of the chemical from the supply port 35a to the sides of the heater 80 and the thermocouples 83 and 84 in the expanse direction of the upper surface 31c can be promoted by the inert gas.

Further, a suppression groove 141 that extends in the widthwise direction of the upper surface 31c of the main body 131 is formed in the upper surface 31c on the side opposite to the heater 80 and the thermocouples 83 and 84 with respect to the supply port 35a. With this configuration, spreading of the chemical from the supply port 35a to the side opposite to the heater 80 and the thermocouples 83 and 84 in the expanse direction of the upper surface 31c is suppressed. As a result, the amount of chemical flowing to the sides of the heater 80 and the thermocouples 83 and 84 in the expanse direction of the upper surface 31c can be increased such that spreading of the chemical to the sides of the heater 80 and the thermocouples 83 and 84 is promoted. Note that since the suppression groove 141 extends rectilinearly along the widthwise direction of the upper surface 31c, the configuration of the suppression groove 141 can be simplified.

Figure 13:
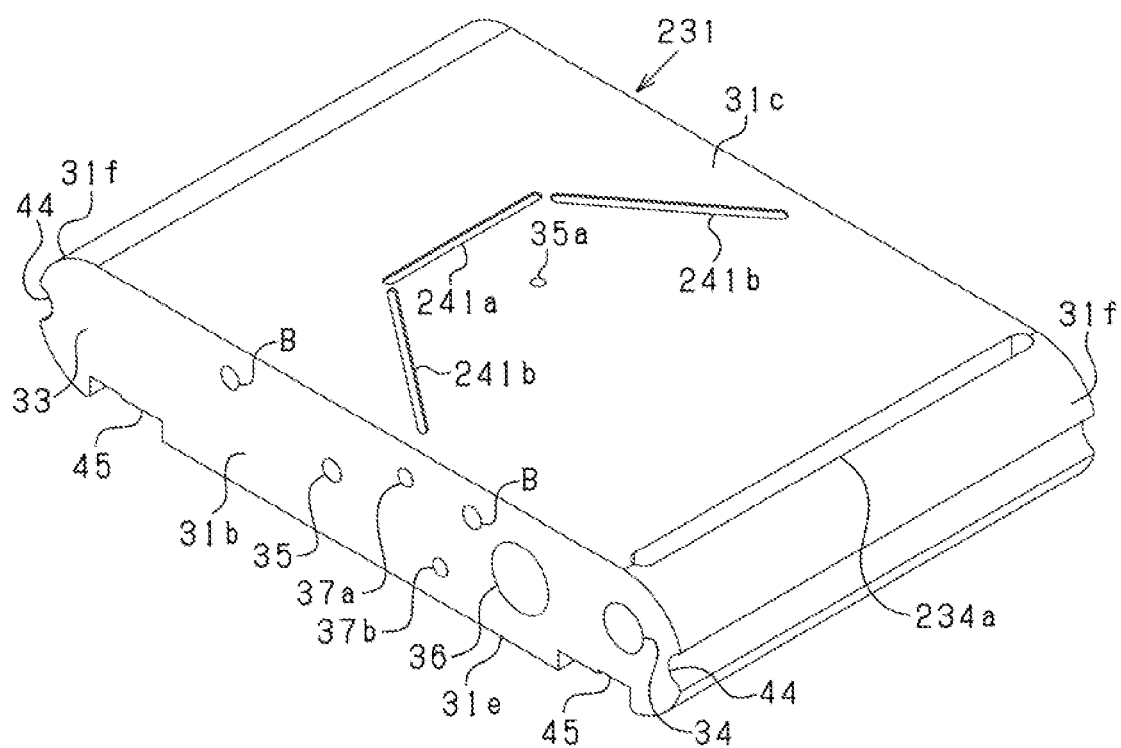
FIG. 13 is a perspective view showing another modified example of the main body of the liquid control apparatus.

FIG. 13 is a perspective view showing another modified example of the main body 31 of the liquid control apparatus 30. As shown in the drawing, a discharge port 234a is formed in a main body 231 in one lengthwise direction end of the upper surface 31c, while the introduction port 33a is not formed. In other words, the inert gas is introduced from the first housing 11 rather than an interior of the main body 231. More specifically, an inert gas introduction port is formed in an inner periphery of the first housing 11 in a position removed from the discharge port 234a. Likewise with this configuration, the inert gas introduced into the columnar space S can be discharged from the discharge port 234a. Further, the discharge port 234a is formed to extend around the entire widthwise direction length of the upper surface 31c, and therefore the mixed gas containing the inert gas and the vaporized chemical can be discharged from the discharge port 234a efficiently. Note that the inert gas may also be discharged from the first housing 11.

Further, suppression grooves 241a and 241b extending rectilinearly are formed individually in the upper surface 31c of the main body 231. The suppression grooves 241a and 241b surround the periphery of the supply port 35a in the expanse direction of the upper surface 31c on sides excluding the sides of the heater insertion hole 36 (the heater 80) and the thermocouple insertion holes 37a and 37b (the thermocouples 83 and 84). Likewise with this configuration, spreading of the chemical from the supply port 35a to the side opposite to the heater 80 and the thermocouples 83 and 84 in the expanse direction of the upper surface 31c is suppressed. As a result, the amount of chemical flowing to the sides of the heater 80 and the thermocouples 83 and 84 can be increased such that spreading of the chemical to the sides of the heater 80, and the thermocouples 83 and 84 is promoted. Furthermore, an interval between the two suppression grooves 241b in the expanse direction of the upper surface 31c increases toward the sides of the heater 80, and the thermocouples 83 and 84, and therefore the chemical can be caused to spread more widely over the range in which the heater 80 is provided.

Figure 14:
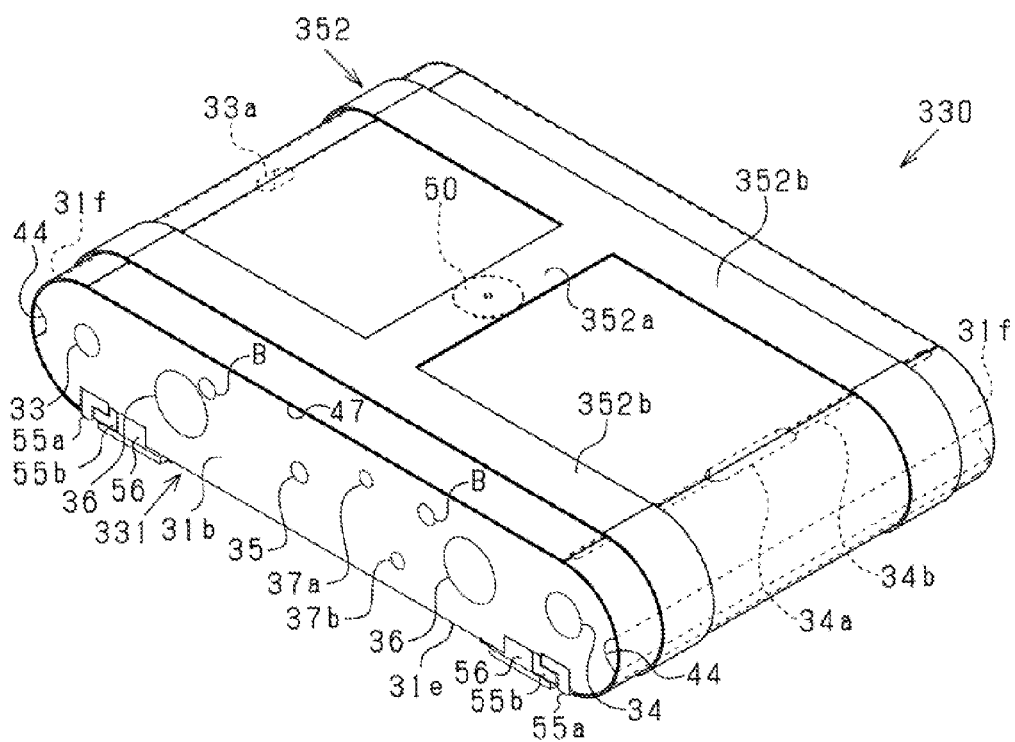
FIG. 14 is a perspective view showing a modified example of the liquid control apparatus.

FIG. 14 is a perspective view showing a modified example of the liquid control apparatus 30. As shown in the drawing, two heater insertion holes 36 are formed in a main body 331, and the heater 80 is inserted into each heater insertion hole 36. The entire upper surface 31c of the main body 331 is heated by the two heaters 80, and therefore the suppression groove 41 and so on are not formed in the upper surface 31c.

Further, an "H" shaped mesh band 352 is wrapped around the outer periphery of the mesh 47. A central portion 352a of the mesh band 352 is provided to extend in the widthwise direction of the upper surface 31c and to cover the blocking member 50 (the supply port 35a). Side portions 352b of the mesh band 352 are provided to extend in the lengthwise direction of the upper surface 31c close to the respective widthwise direction end portions of the upper surface 31c. The two side portions 352b are connected by the central portion 352a.

With this configuration, the chemical supplied from the supply port 35a is caused to spread preferentially in the widthwise direction of the upper surface 31c along the central portion 352a. Furthermore, the chemical is caused to spread preferentially in the lengthwise direction of the upper surface 31c along the side portions 352b connected to the central portion 352a. As a result, the chemical can be caused to spread efficiently to the side of the two heaters 80.

The blocking member 50 may be provided on the outer side of the mesh band 52, 152 and 352. Further, the shape of the blocking member 50 may be modified as desired as long as the blocking member 50 covers the supply port 35a.

A method of knitting (weaving) the mesh 47, and the mesh band 52, 152 and 352 is not limited to plain weave, and another weaving method such as diagonal weave may be employed. Further, the mesh size of the mesh 47, and the mesh band 52, 152 and 352 is preferably set appropriately within a range of approximately 100 to 500 mesh in accordance with the wettability thereof relative to the chemical, the chemical wettability of the main body 31, the viscosity of the chemical, and so on.

In the embodiments described above, the mesh band 52, 152 and 352 is woven into mesh form, but the mesh band 52, 152 and 352 may be formed in film form. In this case, the film form band functions as the blocking member 50, and therefore the blocking member 50 may be omitted. The blocking member 50 may also be omitted in cases where a supply pressure of the chemical is low such that the chemical is unlikely to spurt out through the mesh 47, and the mesh band 52, 152 and 352. Conversely, the mesh band 52, 152 and 352 may be omitted from the part in which the blocking member 50 is provided. In other words, the mesh band 52, 152 and 352 may be provided only in parts where the blocking member 50 is not provided. Note that the mesh band 52, 152 and 352 may also be formed in plate form.

The shape of the main body 31 is not limited to a columnar shape having an oval bottom surface, and another shape, such as a rectangular parallelepiped shape, may be employed. Further, the upper surface 31c (the supply subject surface) of the main body 31 is not limited to a planar surface, and a curved surface may be employed instead.

The chemical is not limited to a hydrophobicity processing liquid (HMDS), and another chemical such as a thinner-based solvent or a silane coupling agent may be employed instead. In this case, the materials of the mesh 47, and the mesh band 52, 152 and 352 are preferably modified in accordance with the wettability relative to the chemical. A metal other than a stainless steel material, a resin, or the like, for example, may be used as these materials. Further, the liquid control apparatus 30 is not limited to the liquid vaporizer 10, and may be applied to another apparatus such as a liquid coater or a film forming apparatus.

The invention claimed is:

1. A liquid control apparatus controlling a spread of a liquid,
the apparatus comprising:
a main body having a supply subject surface onto which the liquid is supplied; and
a mesh form body woven into a mesh form and provided to contact the supply subject surface,
wherein a heater configured to heat the supply subject surface is provided in an interior of the main body,
a supply port is provided in the main body to supply the liquid from the interior of the main body to a part of the supply subject surface contacted by the mesh form body, and
a groove is provided in the supply subject surface to suppress spreading of the liquid from the supply port to a side opposite to the heater in an expanse direction of the supply subject surface.

2. The liquid control apparatus according to claim 1, wherein the groove surrounds a periphery of the supply port on sides excluding a side of the heater in the expanse direction of the supply subject surface.

3. The liquid control apparatus according to claim 1, wherein
an introduction port and a discharge port for a gas are provided in the main body,
the introduction port is an opening for introducing the gas into a space on a periphery of the supply subject surface from the interior of the main body,
the discharge port is an opening for discharging the gas into the interior of the main body from the space, and
the introduction port is provided on a side opposite to the discharge port across the heater in the expanse direction of the supply subject surface.

4. The liquid control apparatus according to claim 3, wherein the supply port is provided in the main body between the introduction port and the heater in the expansion direction of the supply subject surface.

5. A liquid control apparatus controlling a spread of a liquid,
the apparatus comprising:
a main body having a supply subject surface onto which the liquid is supplied; and
a mesh form body woven into a mesh form and provided to contact the supply subject surface,
wherein a temperature sensor configured to detect a temperature of the supply subject surface is provided in an interior of the main body,
a supply port is provided in the main body to supply the liquid from the interior of the main body to a part of the supply subject surface contacted by the mesh form body, and
a groove is provided in the supply subject surface to suppress spreading of the liquid from the supply port to a side opposite to the temperature sensor in an expanse direction of the supply subject surface.

6. The liquid control apparatus according to claim 5, wherein the groove surrounds a periphery of the supply port on sides excluding a side of the temperature sensor in the expanse direction of the supply subject surface.

7. The liquid control apparatus according to claim 5, wherein
an introduction port and a discharge port for a gas are provided in the main body,
the introduction port is an opening for introducing the gas into a space on a periphery of the supply subject surface from the interior of the main body,
the discharge port is an opening for discharging the gas into the interior of the main body from the space, and
the introduction port is provided a side opposite to the discharge port across the temperature sensor in the expanse direction of the supply subject surface.

8. The liquid control apparatus according to claim 7, wherein the supply port is provided in the main body between the introduction port and the temperature sensor in the expansion direction of the supply subject surface.

9. The liquid control apparatus according to claim 1, wherein a width of the groove is set at 0.75 to 5.0 mm.

10. The liquid control apparatus according to claim 5, wherein a width of the groove is set at 0.75 to 5.0 mm.

11. The liquid control apparatus according to claim 1, wherein a depth of the groove is set at 0.2 to 0.5 mm.

12. The liquid control apparatus according to claim 5, wherein a depth of the groove is set at 0.2 to 0.5 mm.

13. The liquid control apparatus according to claim 1, wherein a blocking member formed in a plate form or a film form is provided to cover the supply port.

14. The liquid control apparatus according to claim 5, wherein a blocking member formed in a plate form or a film form is provided to cover the supply port.

15. The liquid control apparatus according to claim 13, wherein the blocking member is provided to cover only the supply port and a vicinity of the supply port.

16. The liquid control apparatus according to claim 14, wherein the blocking member is provided to cover only the supply port and a vicinity of the supply port.

17. The liquid control apparatus according to claim 13, wherein
   the blocking member comprises a first part covering the supply port and a second part projecting from the first part, and
   the second part is inserted into the supply port.

18. The liquid control apparatus according to claim 14, wherein
   the blocking member comprises a first part covering the supply port and a second part projecting from the first part, and
   the second part is inserted into the supply port.

* * * * *